United States Patent [19]

Perego

[11] 4,007,947
[45] Feb. 15, 1977

[54] BABY CARRIAGE FOLDABLE IN WIDTH AND SHORTENABLE IN HEIGHT ALSO HAVING THE SEAT-BACK INCLINABLE IN VARIOUS POSITIONS

[75] Inventor: Giuseppe Perego, Arcore (Milan), Italy

[73] Assignee: Perego-Pines S.p.A., Italy

[22] Filed: Jan. 9, 1976

[21] Appl. No.: 647,815

[30] Foreign Application Priority Data

July 25, 1975   Italy ............................... 25754/75

[52] U.S. Cl. ............................. 280/642; 280/42; 280/650
[51] Int. Cl.² ........................................ B62B 7/08
[58] Field of Search .......... 280/641, 642, 644, 647, 280/650, 42; 296/1 B, 28 B

[56] References Cited
UNITED STATES PATENTS

| | | | |
|---|---|---|---|
| 2,616,718 | 11/1952 | Heideman | 280/650 |
| 2,847,058 | 8/1958 | Lee | 280/42 X |
| 3,689,099 | 9/1972 | Patterson | 280/642 X |
| 3,936,069 | 2/1976 | Giordani | 280/644 |

*Primary Examiner*—Robert R. Song
*Assistant Examiner*—Michael J. Forman
*Attorney, Agent, or Firm*—McGlew and Tuttle

[57] ABSTRACT

The carriage has a pair of elongated handles each having an upper sleeve slidable therealong and each having an elongated front leg of the carriage secured to the sleeve. A pair of rear legs have their upper ends pivotally connected to respective front legs intermediate the ends of the latter, and each leg has a support wheel rotatably mounted on its lower end. Respective lower sleeves are slidable along the lower portions of each front leg. A pair of elongated frame members have their lower ends pivotally connected to respective front legs, and straps are secured to the upper end of each frame member, and each strap is formed with spaced apertures therealong and extends through a slot in one of the upper sleeves. The seat back of a carriage seat is secured to its side edges to these frame members and is foldable about a longitudinal center line. By virtue of the apertured straps sliding in the slots of the upper sleeve members, the seat back can be inclined at any selected angles relative to the handles. Spring biased hook means are provided to latch the seat back in adjusted position. An X-frame is formed by a pair of arms pivotally interconnected intermediate their ends, and each arm has its upper end pivotally connected to a respective lower sleeve. Tie rods are connected to the upper ends of the arms, and are interconnected to an operating knob. By upward or downward movement of the operating knob, the X-frame can be contracted or expanded to selectively collapse or erect the carriage.

4 Claims, 7 Drawing Figures

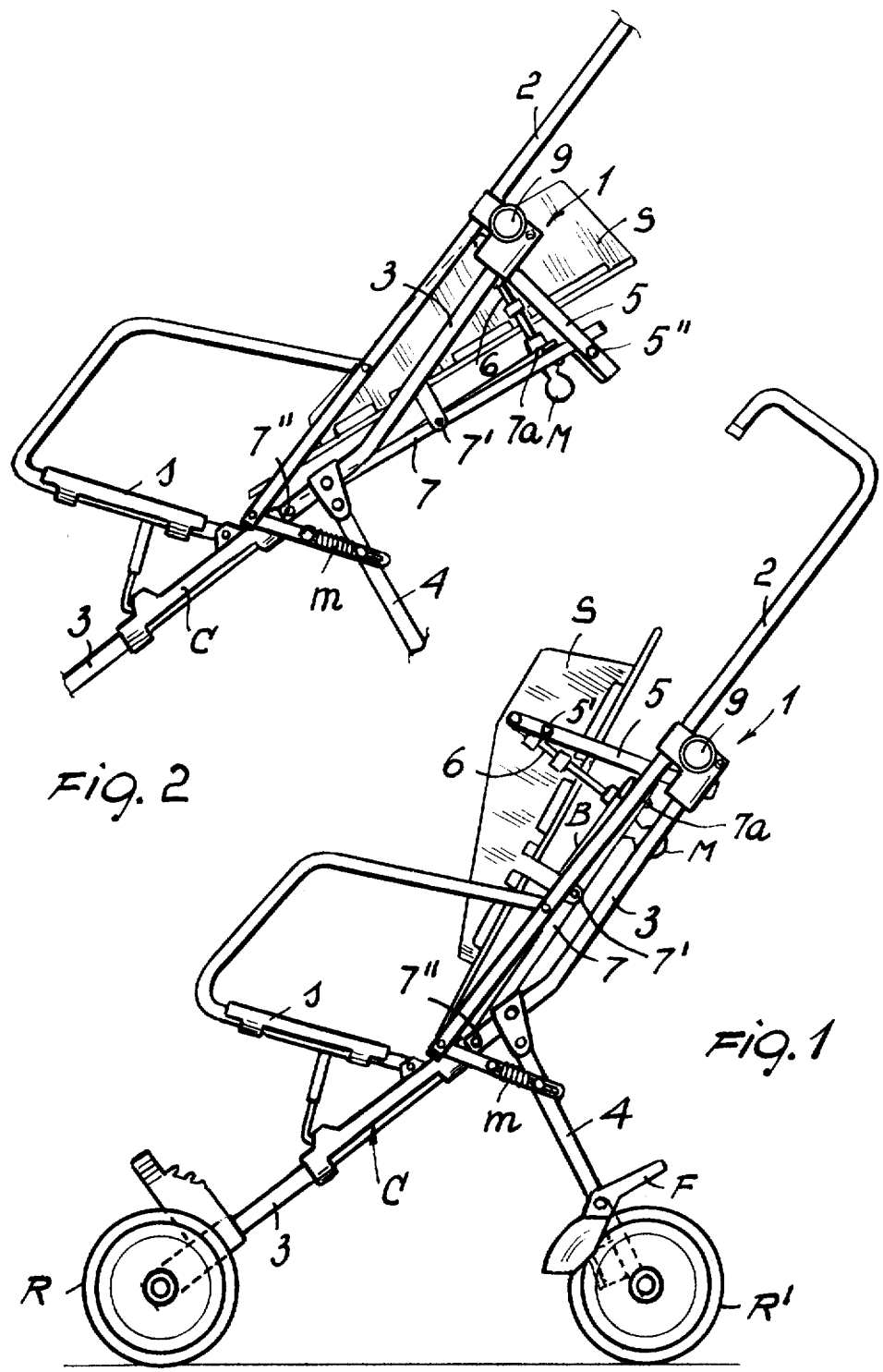

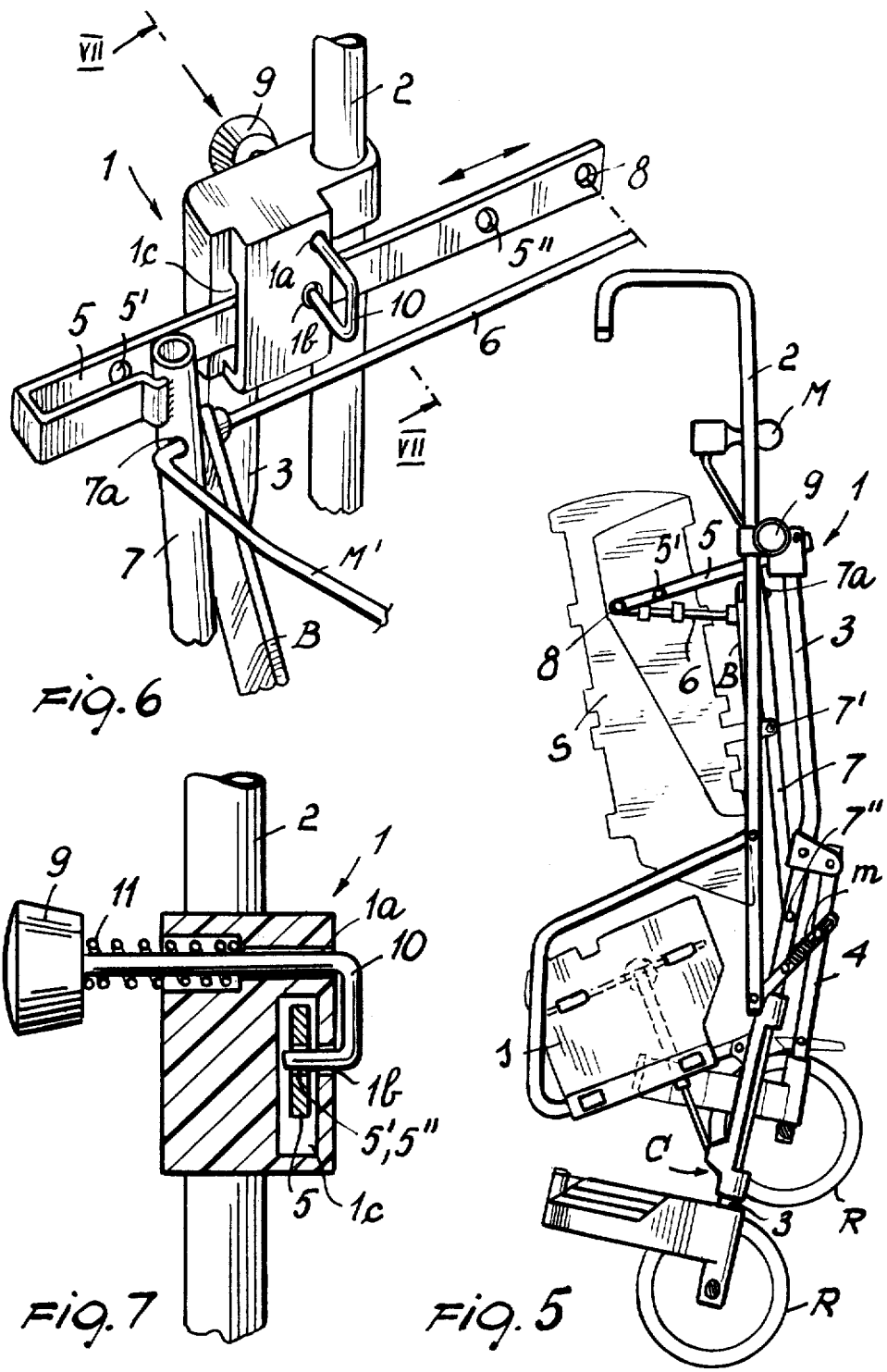

BABY CARRIAGE FOLDABLE IN WIDTH AND SHORTENABLE IN HEIGHT ALSO HAVING THE SEAT-BACK INCLINABLE IN VARIOUS POSITIONS

FIELD AND BACKGROUND OF THE INVENTION

A baby carriage, foldable in width and shortenable in height so as to be easily carried on a person's arm like an umbrella, is the object of my copending U.S. patent Application Ser. No. 647,876.

The most important feature of patent Application Ser. No. 647,876 is the provision of a spider or crosspiece the ends of which are integral with respective sliding pieces or sleeves, including upper sleeves on the handles and lower sleeves on the front legs of the baby carriage. A knob is located at the center with resepct to the upper sleeves and connected thereto by means of two tie rods, whereby, by raising the knob, folding of the crosspiece and shortening of the baby carriage, take place.

Other features of patent Application Ser. No. 647,876 are:

a. the L shape of the tie rods controlled by the knob, each having one arm secured to one of the sides of the seat-back, whereby the latter is also foldable in the direction of its width;

b. the provision of a rigid structure, preferably made of plastic material, for the seat-back as well as for the seat itself, which is well suited to the good health of the child;

c. the provision of small telescoping elements the inner sliding rod portions of which are fixed to the lower sleeves and the outer tubular portions of which are welded to longitudinal metal rods provided underneath the seat, which is also laterally connected to the lower sleeves, whereby the seat may be folded in "book" fashion;

d. the provision of metal straps connecting the rear legs, with the lower sleeves (sliding on the front legs) and with the lower ends of the handles, whereby the rear legs come automatically closer to the front ones when the baby carriage is folded.

SUMMARY OF THE INVENTION

The object of the present application is an improvement to the baby carriage disclosed in patent Application Ser. No. 647,876, in which the baby carriage back is inclinable in various positions with respect to the vertical. This makes the baby carriage extremely practical and rational and is a substantial practical development in the field since, heretofore, foldable baby carriages for easy transport offering in addition the possibility of varying the position of the seat-back, thus enabling the child to rest as desired, have never been devised.

This result is obtained essentially by eliminating the direct connections of the crosspiece or spider and the knob tie rods to the upper sleeves, and by indirectly connecting these elements thereto by means of two upright frame members and two units each consisting of a metal strap and a spring hook provided to adjust and retain the seat-back.

The accompanying drawings show by way of example only, and without limitation a preferred embodiment of the baby carriage according to the invention.

BRIEF DESCRIPTION OF THE DRAWINGS

In the drawings:

FIGS. 1 and 2 are side views of the baby carriage with the seat-back in the respective extreme positions namely relatively forwardly and relatively rearwardly inclined;

FIG. 5 is a side view showing the carriage in the folded position;

FIGS. 6 and 7 are respectively a perspective view and a side view, partially sectioned along line VII—VII of FIG. 6, on an enlarged scale and showing one of the units consisting of a metal strap and a spring hook provided to adjust and retain the seatback.

Figures 3, 4:
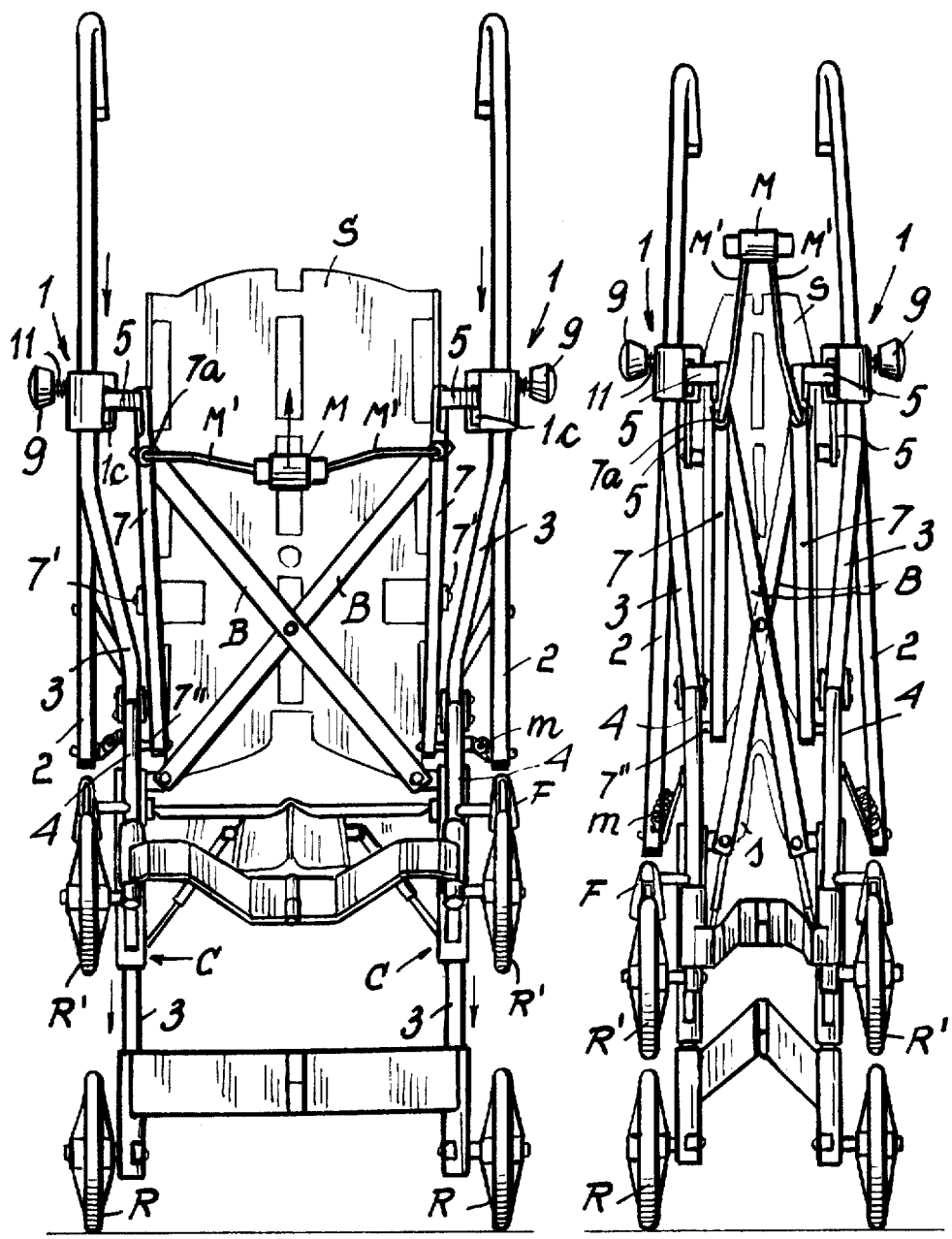
FIGS. 3 and 4 are rear views of the baby carriage in the extended position ready for use and in the folded position, respectivley.

As may be seen from the drawing, the baby carriage according to the invention has the same constructional features as the one disclosed in patent Application Ser. No. 647,876 since it also has the spider or crosspiece B, the upper pieces or sleeves, indicated here with reference number 1, and the lower pieces of sleeves C, the center knob M with tie rods, indicated here with M', the longitudinal rods underneath the seat s, welded to the tubular portions of the small telescoping elements having their inner sliding rods secured to the lower sleeves C, and the metal straps interconnecting the rear legs and the lower sleeves (which slide on the front legs).

The baby carriage handles, terminating like a hook so as to be easily carried on the arm, are indicated at 2, the front legs at 3 and the rear legs at 4, the seat at s, the seat-back at S, the brakes at F, the front wheels at R and the rear wheels at R'. When the knob M is raised, it displaces the top tie rods M' upwardly and causes the crosspiece arms B to come closer to each other. The arms 6 of tie rods M', integral with the side portions of the seat-back S, cause folding thereof in "book" fashion.

As a result the upper sleeves 1 slide on handles 2 and the lower sleeves C on the front legs 3, thus shortening in height the baby carriage.

The inner portions or rods of the small telescoping elements are pushed downwardly by the lower sleeves C as well as the side portions of the seat s integral with these sleeves (see FIG. 1) whereby the seat s is also caused to fold in "book" fashion with the central portion at the top.

Contrary to the embodiment described in Application Ser. No. 647,876 the upper sleeves 1, instead of being L-shaped, are T-shaped as seen from the side as well as from the top, and the upper ends of arms B of the spider or crosspiece still have tie rods M' engaged therethrough but, by means of the tie rods, are connected to frame members 7, which also have the tie rods linked therethorugh as shown at 7a.

The lower ends of frame members 7 are secured to the front legs 3, in points 7", and at the centers of members 7 are connected to the side portions of the seat-back S at 7'. Bent U-shaped ends of straps 5 are secured to the upper ends of members 7 enter and straps 5 extend through suitable longitudinal slots in upper sleeves or members 1. The hook 10, terminating like a "crook," is slidably engaged through upper sleeve 1, having its longer leg slidable in aperture 1a, and its lower leg sidable in aperture 1b. When a spring 11, which is wound therearound adjacent its projecting end, is compressed by a hand-grip 9, the shorter leg of hook 10 is disengaged from the hole 5' or 5" by movement outwardly in aperture 1b, and thus disengages strap 5, which then will be able to slide through the slot 1c of sleeve 1. Links interconnect each rear leg to the lower end of the adjacent handle to move the rear legs toward the front legs when the carriage is folded and to maintain the rear legs extended when the carriage is erected.

The metal straps 5 have two or more holes 5', 5" therein for fixing, by means of a hook 10, in an equal number of different positions, to the respective sleeve 1, through which they extend in slot 1c, and have their ends fixed at 8 to respective arms 6 of tie rods M', thereby they are entrained therewith in the various positions, more or less inclined with respect to the vertical, of the seat-back S.

From FIG. 6, it may clearly be seen how each sleeve 1 also slides with resepct to a respective handle 2 extending therethrough and connected to a respective front leg 3, as disclosed in Application Ser. No. 647,876 to which reference is made for other constructional details.

While a specific embodiment of the invention has been shown and described in detail to illustrate the application of the principles of the invention, it will be understood that the invention may be embodied otherwise without departing from such principles.

What we claim is:

1. A foldable baby carriage comprising, in combination, a pair of laterally spaced elongated handles; respective upper sleeve members slidable on said handles; a pair of elongated front legs having their upper ends secured to respective upper sleeve members; a pair of elongated rear legs each pivotally connected to an intermediate portion of a respective front leg; respective wheels on the lower ends of said front and rear legs; respective means interconnecting each rear leg to the lower end of the adjacent handle to move the rear legs toward the front legs when the carriage is folded and to maintain the rear legs extended when the carriage is erected; respective lower sleeve members slidable on the lower portions of said front legs; and X-frame formed by a pair of elongated arms pivotally interconnected intermediate their ends; a pair of laterally spaced upright elongated frame members having their lower ends pivotally connected to respective front legs intermediate the ends of the latter; respective adjusting means secured to the upper ends of said frame members and each adjustably engaged with a respective upper sleeve member, whereby said frame members are angularly adjustable relative to said handles; a carriage seat including a seat back secured at its side edges to said frame members for adjustment therewith and foldable about a longitudinal center line parallel to its side edges; each arm of said X-frame having its upper end pivotaly connected to the upper end of a respective frame member adjacent one handle and its lower end pivotally connected to the lower sleeve slidable on that front leg connected to the upper sleeve slidable on the other handle; operating means interconnecting the upper ends of said arms for conjoint displacement of the associated upper sleeve members along the respective handles to contract and expand said x-frame, with said lower sleeve members being displaced along the respective front legs, to selectively erect or collapse said foldable baby carriage; and releasable retaining means operatively interconnecting said adjusting means with the respective upper sleeve members to adjust the inclination of the seat back; whereby said seat back may be adjustably inclined and releasably retained in adjusted position.

2. A foldable baby carriage, as claimed in claim 1, in which each adjusting means comprises an apertured metal strap; said releasable retaining means comprising respective hook members displaceably mounted on each upper sleeve member and engageable with a selected aperture in the associated metal strap; and respective spring means biasing each hook member to engage an aperture in the associated metal straps.

3. A foldable baby carriage, as claimed in claim 2, in which each metal strap is a rectangular U-shape, including a short leg and a long leg, the long leg being formed with longitudinally spaced apertures each upper sleeve member being formed with a relatively wide slot having the long leg of a respective strap extending therethrough; the short leg of each strap being rigidly connected, at its end, to the upper end of the associated frame member; each hook member having a substantially U-shape with a longer leg extending through one bore of the associated upper sleeve member and a shorter leg extending through a second bore of the associated upper sleeve member and engageable with an aperture in the long leg of the associated strap member; respective tie rods having first elongated legs extending through apertures in the upper end of respective frame members and through apertures in the upper end of the associated arm of said X-frame, with each first leg being secured, at its end, to the longer leg of the associated metal strap; each tie rod having a second arm and said second arms extending toward each other; said operating means including a knob interconnecting the second arms of said tie rods; said seat back having wings at its side edges secured to the first arms of respective tie rods.

4. A foldable baby carriage, as claimed in claim 3, in which each upper sleeve member is a block which is T-shaped in plan and in elevation; said slot being formed through the stem of one T and said apertures for said hook members extending transversely of said block with respect to said slot; the longer leg of each hook member having an operating knob secured thereto, and said spring being disposed between said operating knob and the associated upper sleeve member.

* * * * *